United States Patent
Cohen (10) Patent No.: US 11,847,930 B2
(45) Date of Patent: Dec. 19, 2023

(54) THREE DIMENSIONAL CUBE-LIKE MEMBER

(71) Applicant: Arjee Cohen, The Hague (NL)

(72) Inventor: Arjee Cohen, The Hague (NL)

( * ) Notice: Subject to any disclaimer, the term of this patent is extended or adjusted under 35 U.S.C. 154(b) by 474 days.

(21) Appl. No.: 16/897,313

(22) Filed: Jun. 10, 2020

(65) Prior Publication Data
US 2020/0394936 A1    Dec. 17, 2020

Related U.S. Application Data

(60) Provisional application No. 62/862,057, filed on Jun. 15, 2019.

(51) Int. Cl.
| | | |
|---|---|---|
| *A63H 33/10* | (2006.01) | |
| *G09B 23/04* | (2006.01) | |
| *G09B 5/02* | (2006.01) | |
| *G09B 19/00* | (2006.01) | |

(52) U.S. Cl.
CPC .......... *G09B 23/04* (2013.01); *A63H 33/108* (2013.01); *G09B 5/02* (2013.01); *G09B 19/003* (2013.01)

(58) Field of Classification Search
CPC ...... A63H 33/04; A63H 33/10; A63H 33/108; A63F 9/12; A63F 9/1208; A63F 9/1252
See application file for complete search history.

(56) References Cited

U.S. PATENT DOCUMENTS

| | | | | |
|---|---|---|---|---|
| 1,472,536 A | | 10/1923 | Thomson | |
| 2,799,118 A | * | 7/1957 | Lullo | A63H 33/06 411/908 |
| 2,803,088 A | | 8/1957 | Swann | |
| 3,110,123 A | | 11/1963 | Pearson | |
| 3,458,949 A | * | 8/1969 | Young | A63H 33/108 446/124 |
| 3,611,621 A | * | 10/1971 | Folson | A63H 33/08 446/124 |
| 3,613,291 A | * | 10/1971 | Howe | A63H 33/108 446/124 |
| 3,747,261 A | * | 7/1973 | Salem | B23Q 1/545 446/124 |
| 3,822,487 A | * | 7/1974 | Koch | G09B 17/00 40/620 |
| 4,326,354 A | | 4/1982 | Hagberg | |
| 4,405,131 A | * | 9/1983 | Horvath | A63F 9/0834 273/153 S |
| 4,427,197 A | * | 1/1984 | Doose | A63F 9/0842 273/153 S |
| 4,540,177 A | * | 9/1985 | Horvath | A63F 9/0834 273/153 S |

(Continued)

FOREIGN PATENT DOCUMENTS

| | | |
|---|---|---|
| CN | 201710975 U | 1/2011 |
| CN | 203736858 U | 7/2014 |

(Continued)

*Primary Examiner* — Milap Shah
(74) *Attorney, Agent, or Firm* — The Law Office of Joseph L. Felber (57) ABSTRACT

A structure for providing accessibility to knowledge skills of load bearing includes several cubes. Each cube includes bores formed through each facet of the cube that are suitable for receiving pegs or link members, and each cube includes markings in order to assist in identification of the and/or an internal cube at a center of the cube.

14 Claims, 13 Drawing Sheets

(56) References Cited

U.S. PATENT DOCUMENTS

| | | | | | |
|---|---|---|---|---|---|
| 5,098,328 | A | * | 3/1992 | Beerens | A63H 33/086 446/128 |
| 5,318,470 | A | * | 6/1994 | Denny | A63H 33/10 52/655.2 |
| 5,554,062 | A | * | 9/1996 | Goldsen | A63F 9/0098 446/124 |
| 5,795,163 | A | * | 8/1998 | Alioto | G09B 1/36 434/167 |
| 5,924,906 | A | * | 7/1999 | Grafton | A63H 33/10 446/124 |
| 6,044,990 | A | * | 4/2000 | Palmeri | A47B 47/0016 403/231 |
| 6,641,453 | B1 | * | 11/2003 | Morales | A63H 33/04 446/124 |
| 8,398,470 | B2 | * | 3/2013 | Gillies | A63F 9/0613 463/31 |
| 11,077,359 | B1 | * | 8/2021 | Wigh | A63F 9/0842 |
| 11,311,795 | B1 | * | 4/2022 | Lee | A63F 9/0842 |
| 2003/0148700 | A1 | * | 8/2003 | Arlinsky | G09B 1/40 446/91 |
| 2005/0276444 | A1 | * | 12/2005 | Zhou | G06F 3/04815 382/103 |
| 2007/0057455 | A1 | * | 3/2007 | Verdes | A63F 9/0842 273/153 S |
| 2011/0028064 | A1 | | 2/2011 | Christensen et al. | |
| 2012/0032393 | A1 | * | 2/2012 | Leicht | A63H 33/107 273/156 |
| 2016/0101370 | A1 | * | 4/2016 | Madsen | A63H 33/04 446/91 |
| 2018/0161668 | A1 | * | 6/2018 | Chen | A63F 9/0842 |
| 2019/0358549 | A1 | * | 11/2019 | Osipov | A63F 13/25 |
| 2020/0009451 | A1 | * | 1/2020 | Dor | A63F 13/35 |
| 2020/0179819 | A1 | * | 6/2020 | Vucinovic | A63H 33/08 |

FOREIGN PATENT DOCUMENTS

CN 207203478 U 4/2018
KR 101854999 B1 5/2018

\* cited by examiner

THREE DIMENSIONAL CUBE-LIKE MEMBER

TECHNICAL FIELD

Embodiments of the invention relate to a three dimensional cube-like member; and to games, structures and utilities associated therewith.

BACKGROUND

Three dimensional objects can be used in games and in education for providing accessibility to required knowledge skills to the greatest extent possible. Such objects may facilitate the creation of three dimensional structures, and thus may be useful in a general context in the creation of structures not necessarily related solely to games and educational purposes.

Various example are known for use of three dimensional objects in education and in games. U.S. Pat. No. 6,394,452 for example describes a three-dimensional noughts and crosses game in which game pieces are placed in attachment means located at the apexes, lines of intersection and upon the generally planar surfaces of a solid or hollow cube. U.S. Pat. No. 3,110,123 in a further example describes an educational toy that includes a plurality of block-like members with aligned openings, and coupling elements that extend through the openings to interconnect the block-like members. U.S. Pat. No. 1,472,536 in yet a further example describes an educational device that includes a plurality of cubical blocks each provided in its faces, corners, and edges with peg receiving recesses.

SUMMARY

The following embodiments and aspects thereof are described and illustrated in conjunction with systems, tools and methods which are meant to be exemplary and illustrative, not limiting in scope.

An aspect of at least certain embodiments of the present invention, may be taken to broadly relate to providing users with stimulations for exercising significant levels of sensory skill, coordination and/or high cognition—by promoting e.g. brain-hand synchronization in physical space.

Various embodiments of the present invention may thus be arranged to invoke hands-on tactile experience for users by means of dedicated objects that may be arranged to interact with similar type digital objects in a virtual environment that may be presented to users on a screen (or the like).

In certain embodiments, tactile objects such as cube-like formations—may be tracked by sensors, such as cameras, in order to provide interaction with virtual objects.

In certain embodiments, tracking may be facilitated by forming contrast e.g. by use of different colors, in order to allow for frame recognition of the objects. Such computer-based synchronization between the physical and virtual objects may be taken to promote use of hands of users and/or three-dimensional comprehension and/or improved spatial orientation.

In most embodiments, use of such objects, e.g. cubes, may be facilitated without need of a supporting surface or plate upon which such objects may normally be attached. In fact, in most embodiments the formation of structures from cubes may be facilitated by interconnecting pegs or link members—that may be placed in-between cubes to hold one cube substantially firm in place relative to other cubes directly or indirectly attached thereto.

Cubes in certain cases may be of varying size and may be formed from various materials. Each cube may be formed with twenty-six holes/bores, possibly of various form and shape. Each side facet of a cube may have nine holes/bores, which may be connected to any other element or to each other by: peptide chains, beams, pipes, cables, screws or fastening constructions.

In at least certain embodiments, geometrical combinations of tactile objects such as cube-like formations—provide suitable basis for training and/or indulging users in the field of: mathematics, space geometry (etc.) and computer-integrated assembly games.

In various embodiments, cube like formation may serve as a junction for beams, cables or a combination of them in building constructions.

Thus, various embodiments may be useful in urging users to practice spatial thinking, incorporate spatial thinking by using a three-dimensional objects, urging users to handle mathematical/geometrical problems along three dimensional planes, train uses in creative thinking to solve spatial problems and space orientation (etc.).

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 1:
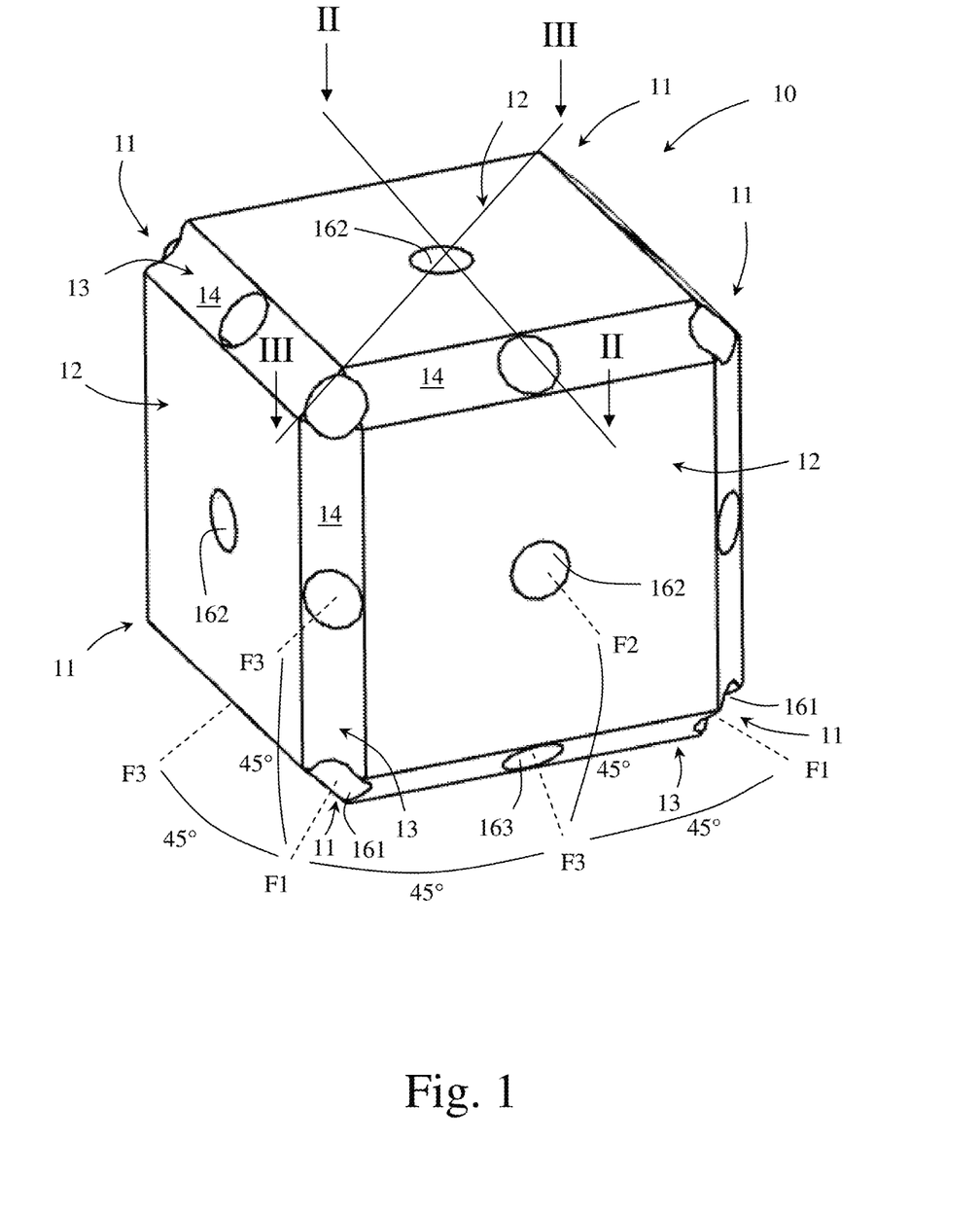
FIG. 1 schematically shows a perspective view of a cube-like member in accordance with an embodiment of the present invention.

Attention is first drawn to FIG. 1 illustrating a perspective view of a cube-like member 10 in accordance with one possible embodiment of the present invention. Cube member 10 includes eight corners 11 and nine preferably equally sized facets 12 with a generally right angle being formed between any two adjacent facets. Each pair of adjacent facets meets at a merge 13 and the cube member 10 may include optional chamfers 14 at a merge 13 where pairs of adjacent facets meet.

Cube member 10 has a main bore 162 associated with each given facet 12 that opens out of the given facet at its center and is formed about an axis F2. Axis F2 extends generally perpendicular to its associated facet 12 and towards a center of the cube. Cube member in addition includes a corner bore 161 at each corner 11 of the cube and a center bore 163 at a center of each merge 13.

Each corner bore 161 opens out of its respective corner 11 and is formed about an axis F1 that extends towards the center of the cube. Each center bore 163 is formed about an axis F3 that also extends towards the center of the cube. Each axis F3 (or bore 163) is angled by about 45 degrees to any adjacent axis F2 (or bore 162), and each axis F1 (or bore 161) is angled by about 45 degrees to any adjacent axis F3 (or bore 163).

Figure 2A:
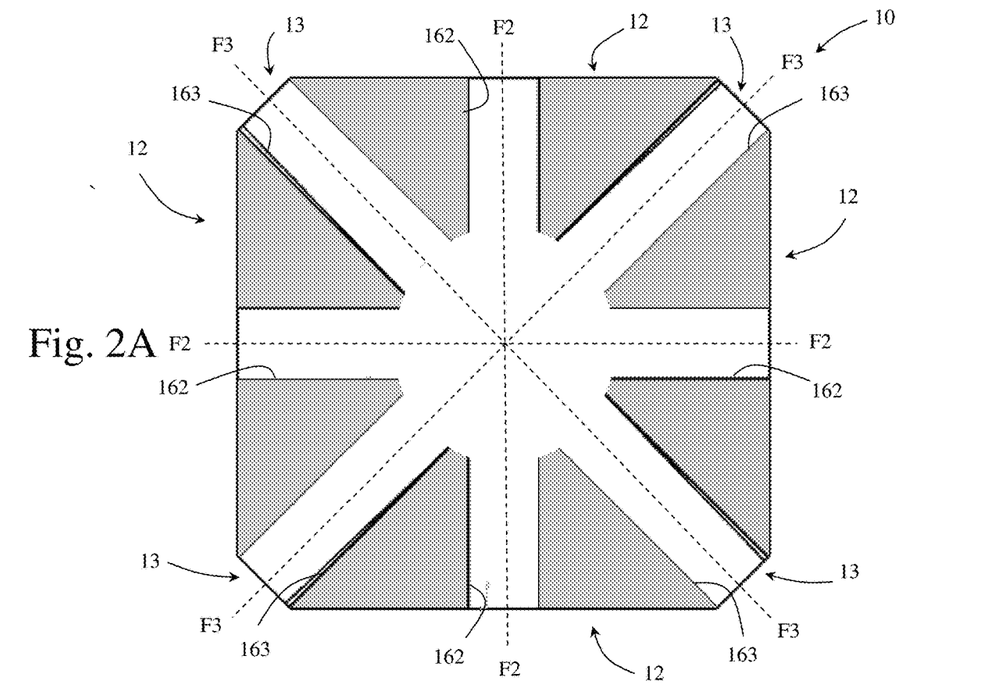
FIGS. 2A and 2B schematically show cross sectional views of the cube-like member of FIG. 1 taken along planes II-II and III-III, respectively.
Figure 2B:
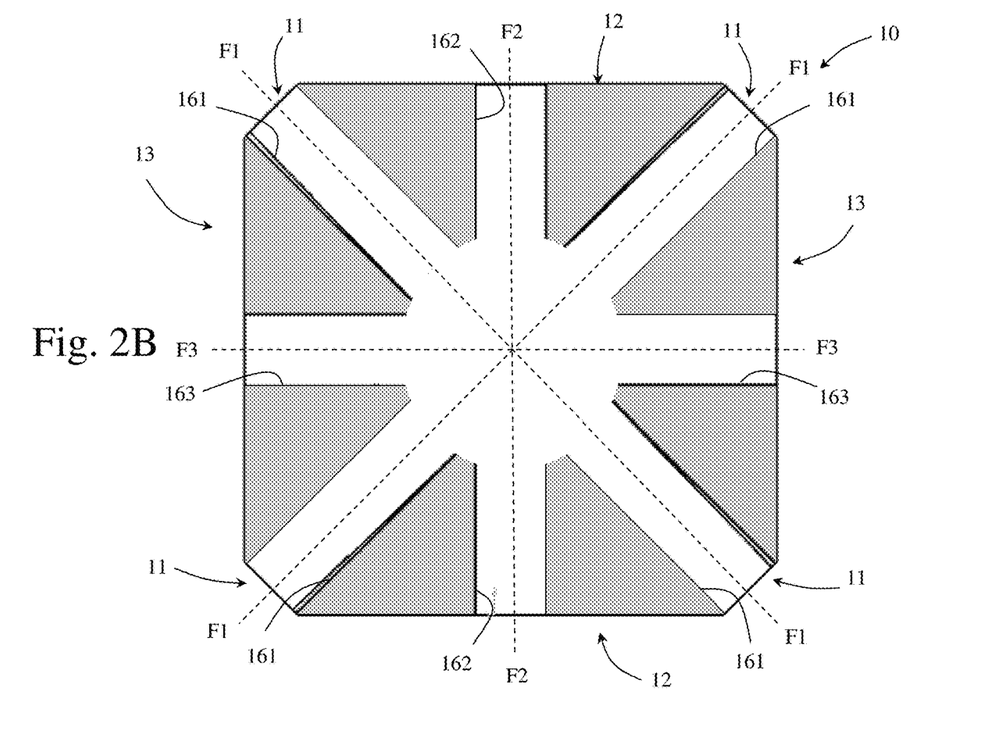

FIG. 2A illustrates a cross sectional view of a cube member 10 generally similar to that shown in FIG. 1, when taken along plane II-II. FIG. 2B illustrates a cross sectional view of a cube member 10 generally similar to that shown in FIG. 1, when taken along plane III-III. In these illustrated views, the bores 161, 162, 163 in cube 10 are shown being formed possibly as through going bores—that meet at the center of the cube in this optional example at a generally spherical like cavity.

Figure 3:
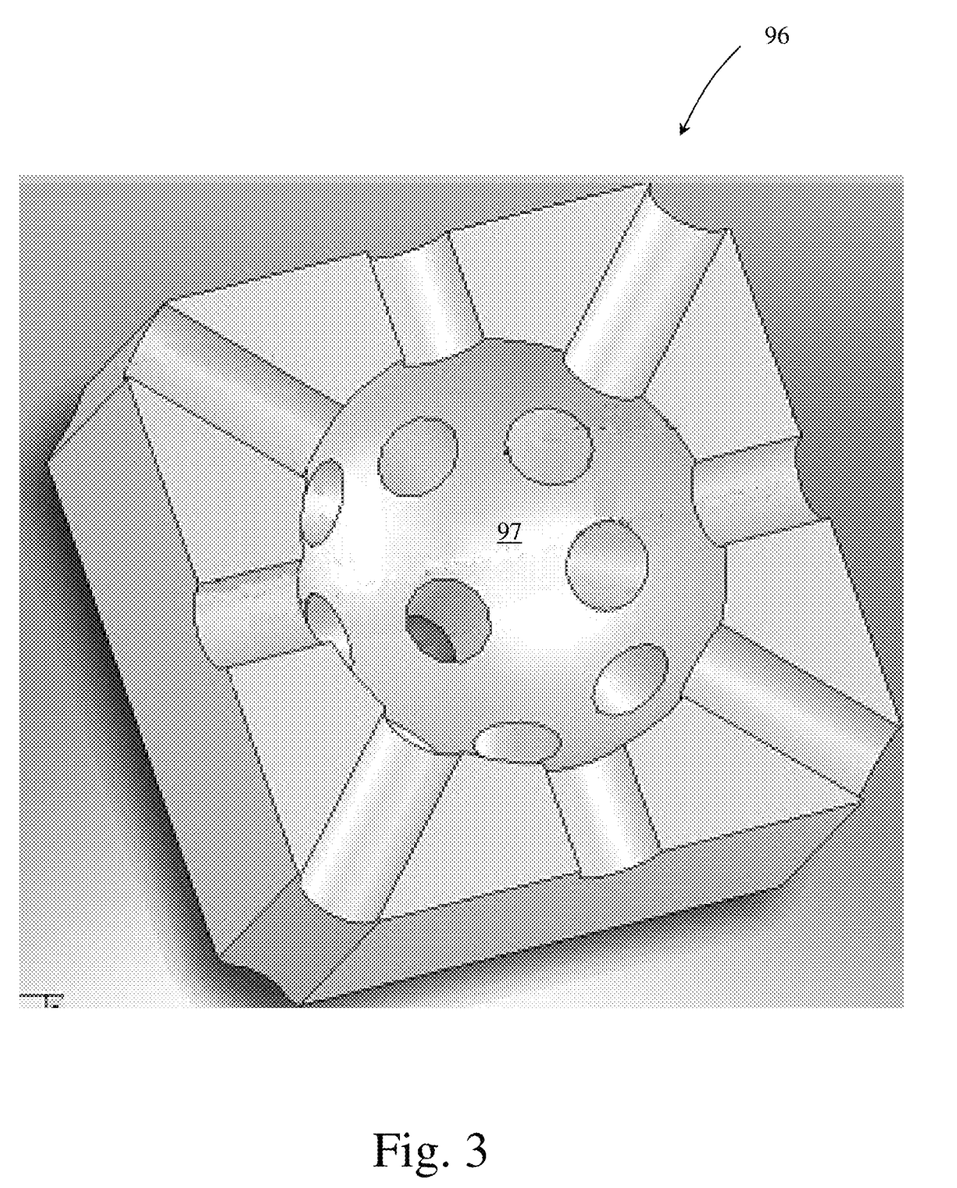
FIG. 3 schematically shows a perspective view of a segment of a cube-like member according to an embodiment of the present invention.

Attention is drawn to FIG. 3 illustrating a perspective view of a segment 96 of a cube-like member in accordance with an embodiment of the present invention. Segment 96 in this view is illustrated taking form of substantially half of a cube like member such as that shown in FIGS. 1, 15 (etc.), and may be used for a variety of uses such as in a structure for providing accessibility to knowledge skills, a member of a load bearing structure (and the like).

Segment 96 may be arranged to attach to a complimentary generally similarly shaped segment (not shown) to form a substantially entire cube-like member (such as seen also in FIGS. 1, 2, 13 and 17 etc.). As here seen, an internal cavity 97 of segment 96 may take various forms, such as a generally spherical form in this example.

Figure 15:
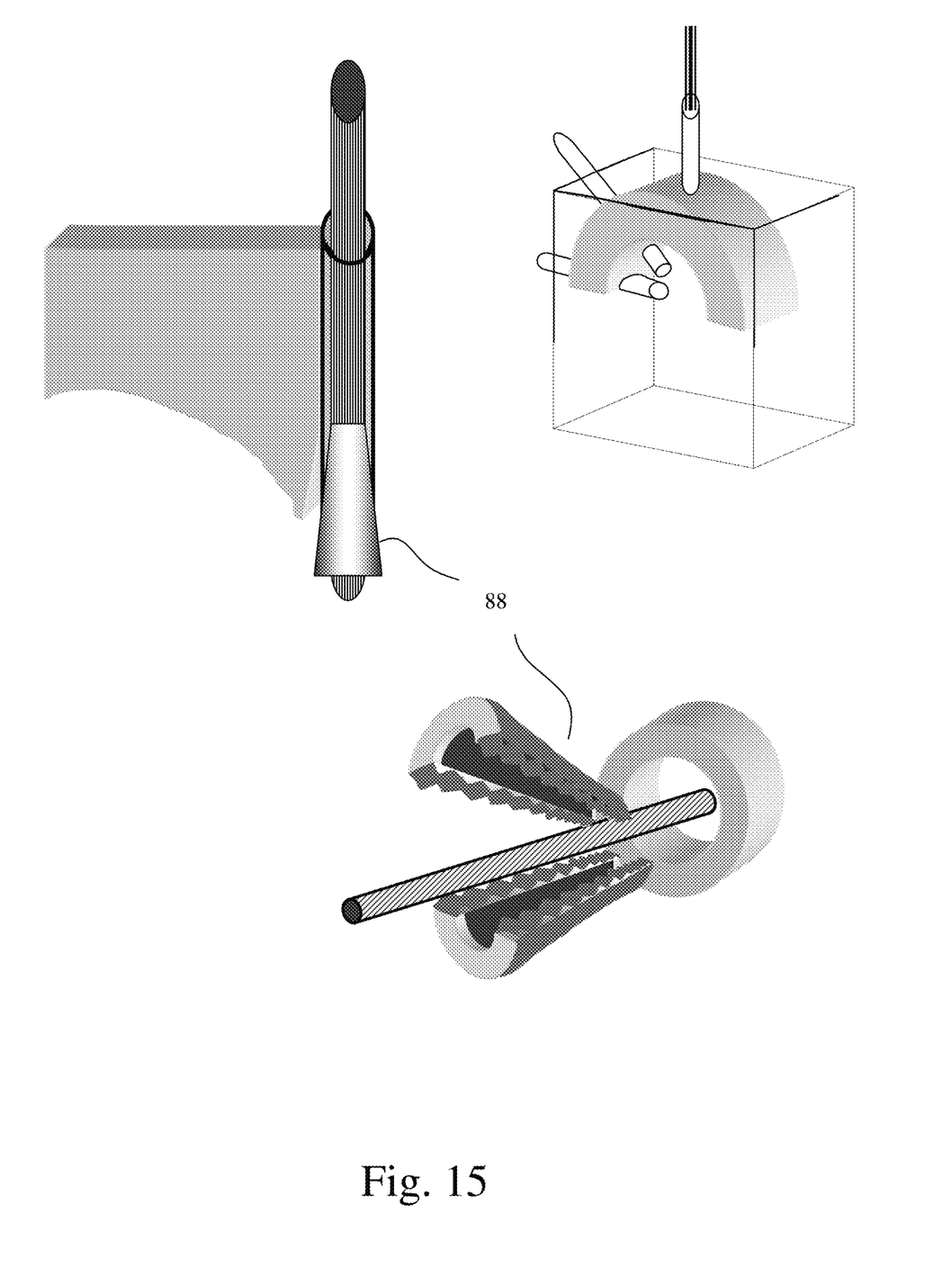

Such internal cavity formation may serve for a variety of utilities, such as providing counter faces upon which internal members placed within a cube's cavity may bear upon (as e.g. fasteners 88 seen in FIG. 15). In another example, the internal cavity may serve for housing devices/elements substantially concealed within the cube, such as an illumination module, possibly controllable to emit light out of the cube via e.g. bores extending though the cube and communicating between its interior and exterior.

This may find utility in various applications, such as in a load bearing structure for at least partially illuminating the structure, or in a structure for providing accessibility to knowledge skills—for providing visual positive feedback to a user upon completion of a task (or the like).

Figure 4:
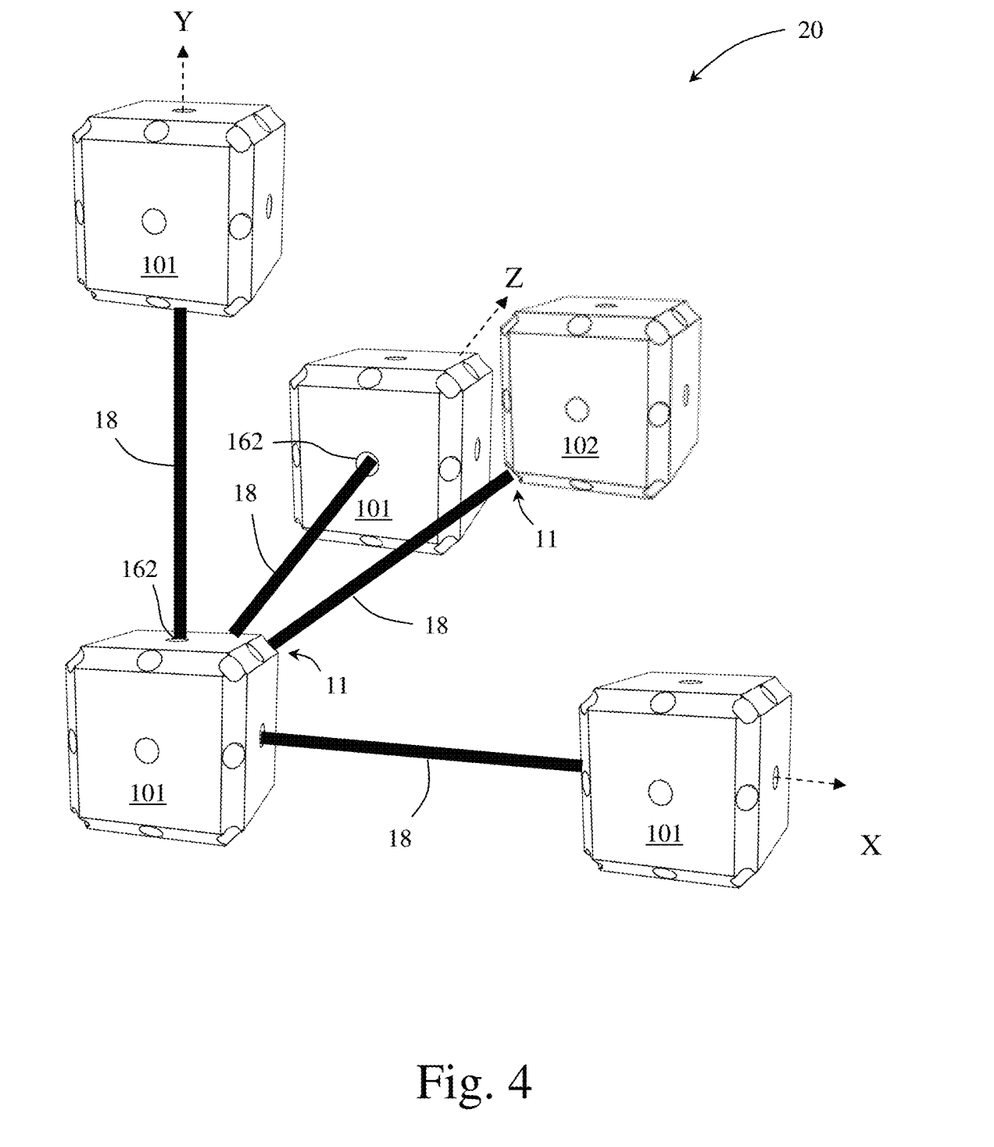
FIG. 4 schematically shows a three dimensional structure formed of cube-like member embodiments generally similar to those in the former figures, here connected by dowel-like pegs in accordance with an embodiment of the present invention.

Attention is drawn to FIG. 4 illustrating one possible use of cube-like members generally similar to those illustrated and discussed in the former figures. In this shown example, the cubes are shown being coupled to each other via dowel-like pegs 18 to form a three dimensional structure 20. In this illustrated optional structure, a possible embodiment is shown including four so-called "orientation" cubes marked 101 that may assist in orienting oneself in the space where the structure is formed, here by assisting in defining a three dimensional Cartesian coordinate system XYZ. It is noted that any other number of cubes may be used for providing such "orientation" including also one single cube (as will be later shown and discussed).

Bores 162 of three adjacent facets that meet at a common corner 11 of an "orientation" cube 101 defining an 'origin' of the coordinate system, may be used to assist in gaining "orientation" in a structure. Dowel-like peg 18 inserted at one end into each one of these bores 162 and attached at their other ends to another "orientation" cube 101—may be used to define the axes XYZ of the coordinate system.

Once setting up the coordinate system, additional "question" cubes 102, coupled by pegs 18 to neighboring cubes in the structure, may be added to the structure, while e.g. their coordinates and/or vectors within the coordinate system can be "questioned" and identified e.g. by a user manually handling the cubes and/or other possible computing means as will be later discussed.

In the example shown in FIG. 4, a peg 18 attached at one end to a corner 11 of an "orientation" cube 101 at the 'origin' of the coordinate system and at its other end to a corner 11 of the "question" cube 102—is formed to extend along a vector that extends transverse to each one of the planes XY, XZ, YZ of the coordinate system at an angle of about 45 degrees.

Thus, at least one aspect of the present disclosure may be seen as relating to cubes, pegs and/or structures such as the ones discussed—that may be used for educational, recreational and/or gaming purposes for training and/or indulging users in the field of geometry.

Figure 5:
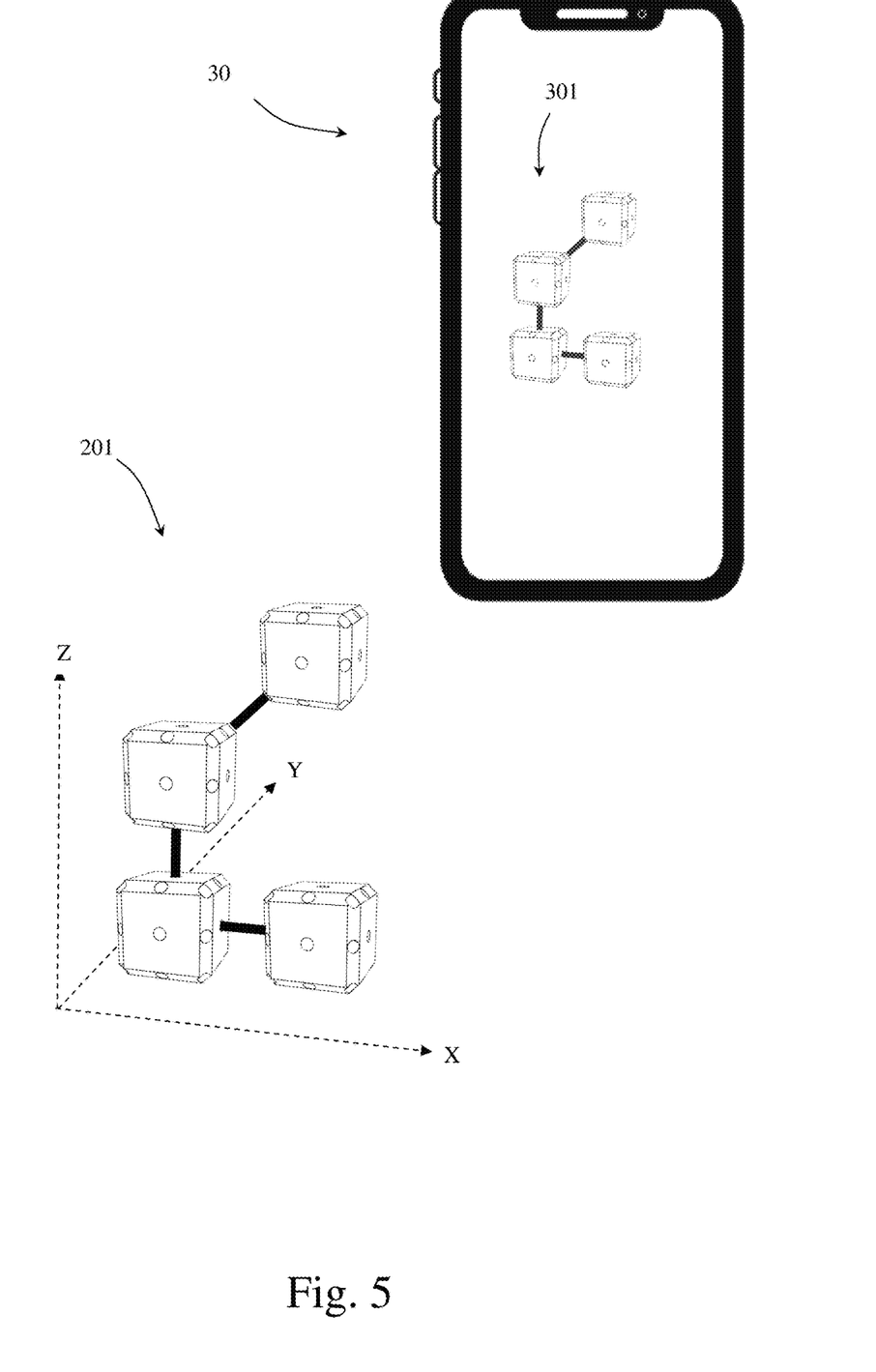
FIG. 5 schematically shows a three dimensional structure generally similar to that in FIG. 4 and a computing device (here a mobile device) in communication and/or interaction therewith.

Attention is drawn to FIG. 5 illustrating a possible aspect of at least certain embodiments of the invention that may include communication and/or interaction between structures, here 201, formed from one or more cubes and/or pegs in the "real" world environment—and a computing device, here a mobile device 30, where a "virtual" representation 301 relating to at least part of the structure 201 may be viewed and/or interacted with.

Attention is drawn to FIGS. 6A to 6D to illustrate and discuss one possible mode of communication/interaction that may be arranged between structures formed of cubes/pegs in the "real" world and "virtual" representations of such structures displayed on a computing device.

Figure 6A:
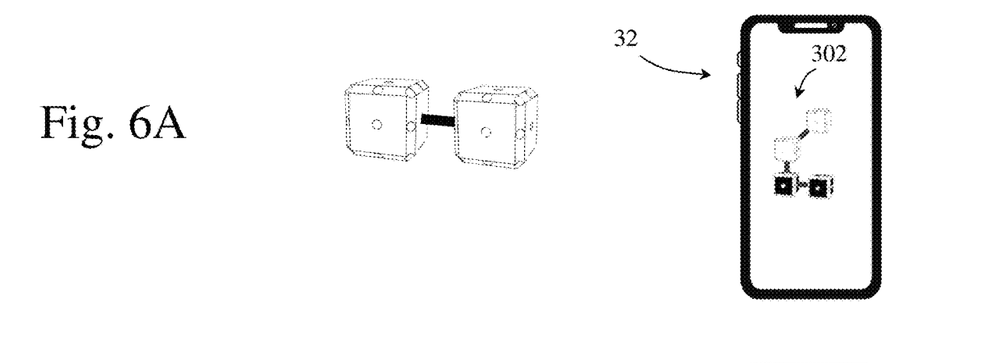
FIGS. 6A to 6D schematically show a possible mode of communication and/or interaction between a structure and a computing device generally similar to those in the former figures.

FIG. 6A may be taken to represent a first possible step of such communication/interaction, where an application software running on a computing device 32 may be used to assist in guiding the creation of the "real" world structure. In this optional example, the application software generates a "virtual" representation 302 of a structure to be created, and a user interacting with the computing device may then be urged to form this structure, possibly from cubes, pegs (or the like) that may be provided in a 'kit'.

The left hand side of FIG. 6A represents two such cubes interconnected by a peg, and the application software possibly via use of the device's camera, may be suited to identify if this structure being monitored fits a portion of the intended "virtual" structure. In this example, the application software identified that the two interconnected cubes fit the bottom part of the "virtual" structure—and the application software provides suitable feedback to the user to his success by optionally marking the matching cubes in the "virtual" model.

Figure 6B:
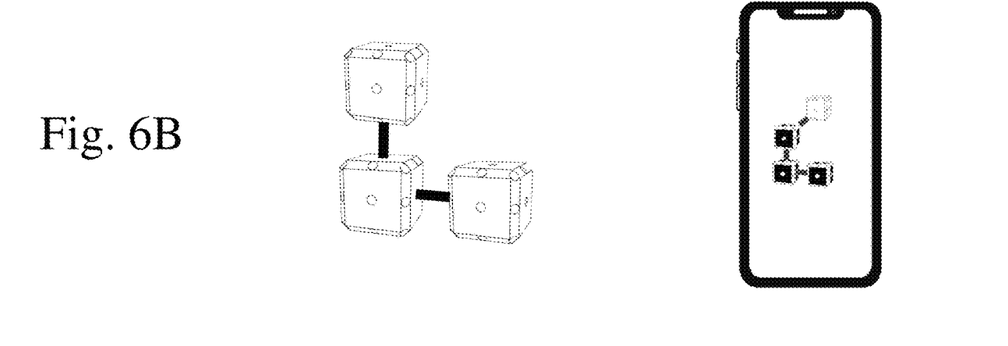
Figure 6C:
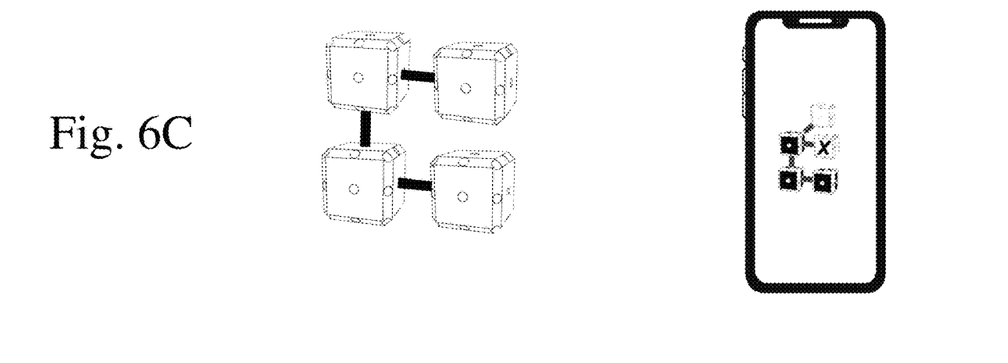
Figure 6D:
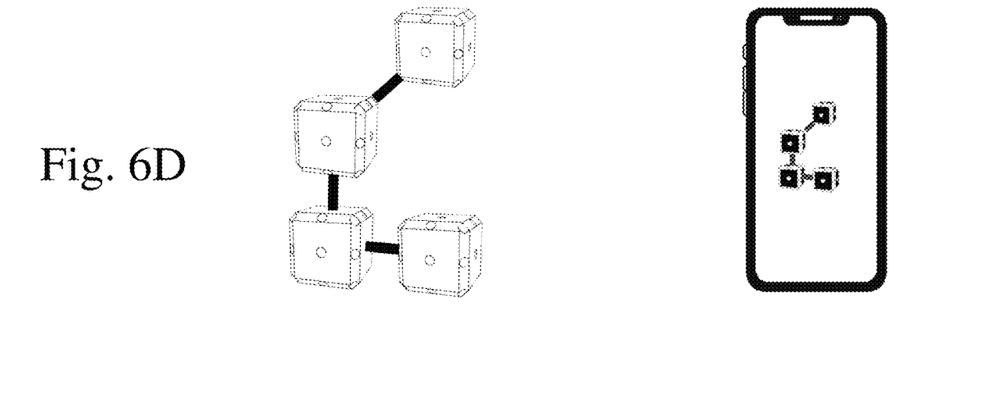

FIGS. 6B and 6D provide examples of additional cubes being successfully added to the "real" world structure—resulting in a positive indication being provided by the application software, here again by highlighting the added blocks in the "virtual" structure. FIG. 6C on the other hand exemplifies a cube being added to an incorrect location in the "real world structure—triggering an indication by the application software to this misplacement.

In at least certain embodiments, cubes may be provided with markings to assist in their identification. Such markings, may e.g. assist in distinguishing between cubes intended to be used as "orientation" cubes versus cubes intended to be used as "question" cubes. Such markings may also assist in distinguishing by the application software between cubes and other none-related background objects that may be located in the environment/background where structures may be formed. Markings may come in various forms such as e.g. by painting cubes in different colors. In certain cases, different parts of a cube (e.g. different facets of a cube) may include different colors, or only some of the facets may be marked (e.g. painted) while others not.

Figure 7:
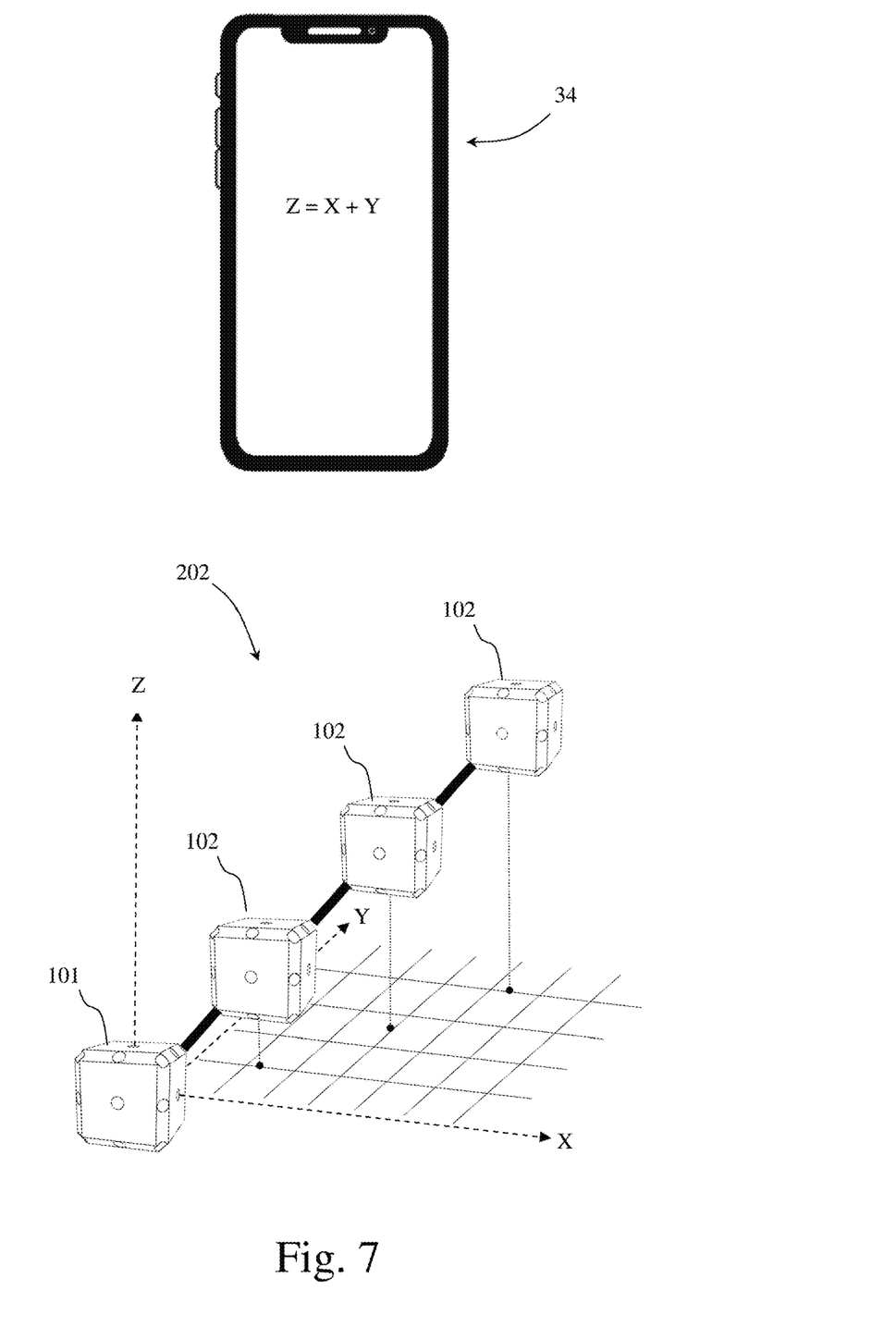
FIG. 7 schematically shows a further possible mode of communication and/or interaction between a three dimensional structure and a computing device generally similar to those in the former figures.

Attention is drawn to FIG. 7 to exemplify use of cubes of various embodiments of the present invention—in training users in fulfilling target statements, such as mathematical equations. In this example, a single cube may be used as an "orientation" cube 101 to define a coordinate system. This may be accomplished by providing a cube with at least some of its facets bearing different colors, and e.g. arranging the application software to associate to each facet an axis according to its color or marking type.

Once setting up such a coordinate system, a "real" world structure 202 formed by adding "question" cubes 102 may be identified by an application software running on a computing device 34 in order to e.g. translate paths/vectors formed by such cubes 102 and their interconnecting pegs to an equation that represents such path within the coordinate system. In another example, a target statement such as an equation presented by the application software may be used to urge a user to create a structure 202 that follows/resembles the statement—while the application software may be arranged to provide positive or negative feedback to the user according to his/her performance.

Figure 8A:
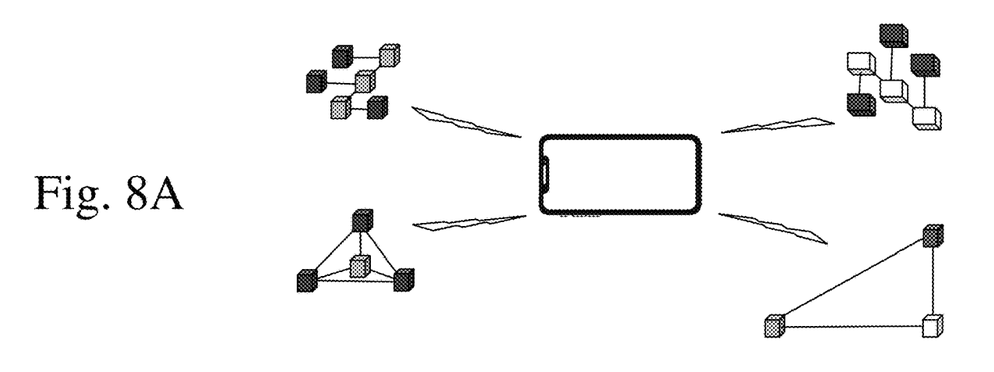
FIGS. 8A to 8C schematically show yet further possible modes of communication and/or interaction between three dimensional structures and computing devices generally similar to those in the former figures.
Figure 8B:
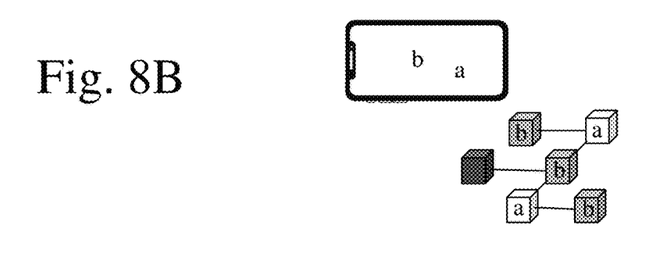
Figure 8C:
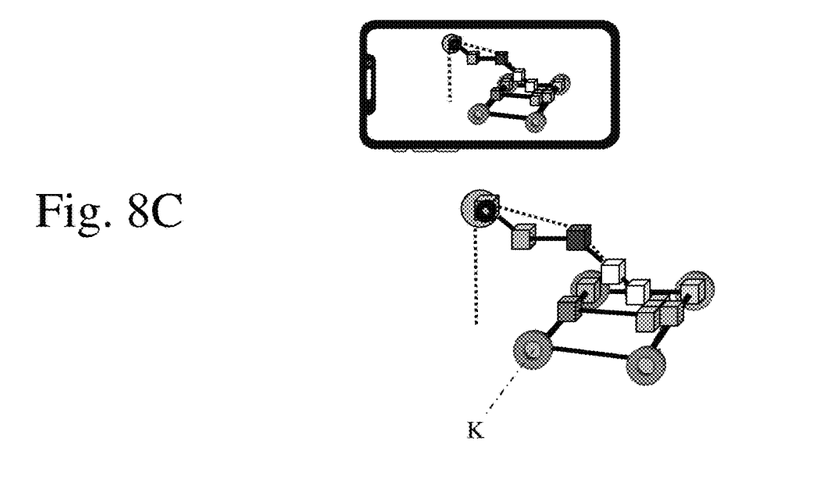

FIGS. 8A to 8C exemplify possible use of cubes of various embodiments of the present invention in training users in a variety of themes. FIG. 8A represents use of various types of structures formed from cubes interconnected with pegs not necessarily all being of the same length and size. FIG. 8B exemplifies use of structures formed of cubes for training users in linguistic word games. And, FIG. 8C exemplifies use of structures formed of cubes together with other structural elements to train users in physics.

Training in physics may be embodied in the shown example by providing a user with building blocks, some of which being cubes of the various embodiments described herein. An application software may be provided with parameters of the building blocks, such as their respective weights—and by monitoring the structure during its formation—may be arranged to compute vector forces acting upon the structure to determine e.g. its stability about certain axes, such as the marked axis K. The application software may e.g. compute moment forces acting on the structure about axis K to determine if the structure may be close to tilting out of stability about axis K—while providing suitable indications to the user.

Figure 9A:
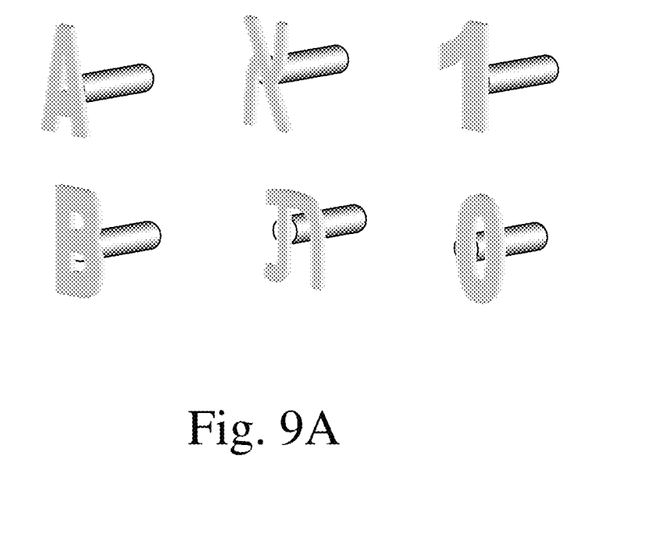
FIGS. 9A and 9B schematically show perspective views of dowel-like peg embodiments (FIG. 9A) and a side view of a dowel-like peg embodiment (FIG. 9B)
Figure 9B:
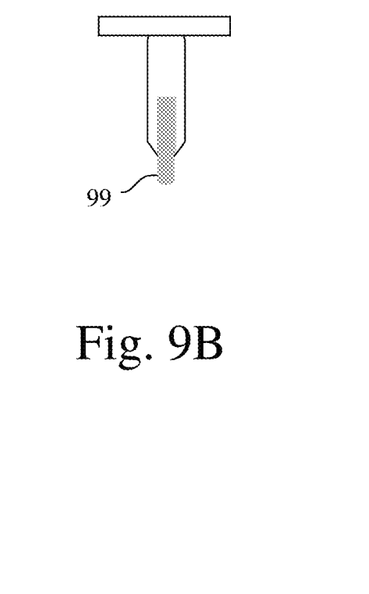

Attention is drawn to FIGS. 9A and 9B illustrating various characters that may be fitted to cubes in linguistic learning exercises. Such characters may be letters in various languages, numbers (or the like). FIG. 9B shows a side view of character arranged to be fitted to a cube, which includes an elastic member 99 for assisting in manual insertion of the characters into one of the bores in the cube.

Figure 10:
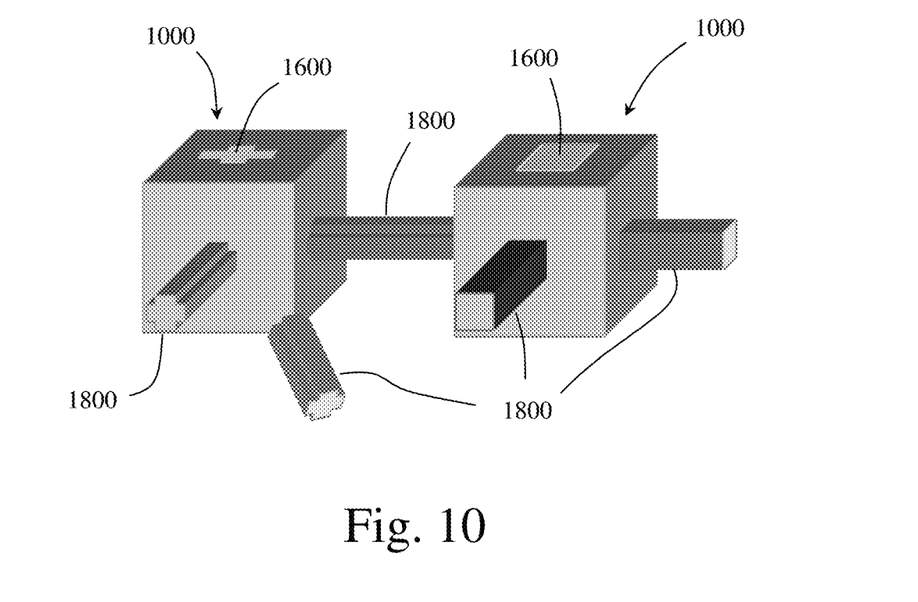
FIG. 10 schematically shows a three dimensional structure formed of cube-like member embodiments connecting to embodiments of dowel-like pegs of the present invention.

Attention is drawn to FIG. 10 representing an aspect of the present invention relating to use of cube-like members 1000 in the formation of a load bearing structures. The cubes seen in this figure may be fitted with bores 1600 of various size and shape in order to provide suitable coupling for force resistance (or the like) required in such a load bearing structure.

Cubes for use in such load bearing structures may also be fitted in at least certain embodiments—with an internal cavity bound by a general spherical face 99—to provide radial directed outgoing paths from such cavity via the bores of the cubes. Such radial directed paths—permit linking load bearing structure type cubes in a variety of directions—with other cubes or elements of the structure—thus also directing forces along such directions.

Figure 11:
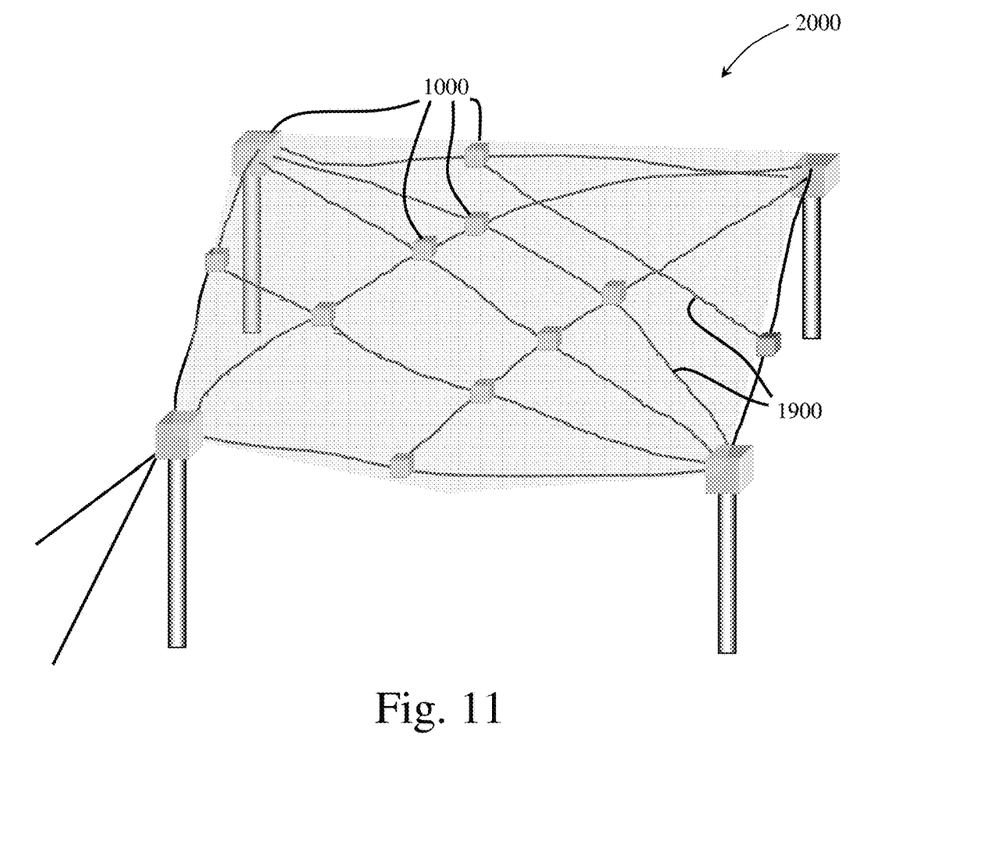
FIG. 11 schematically shows a three dimensional structure, possibly including components such as in FIG. 10, and supporting and/or forming part of a construction.

FIG. 11 demonstrates formation of such a load bearing structure 2000 here including cubes 1000 interconnected by pegs or interconnecting link members 1900 of various size/length. Angeles along which such pegs or interconnecting link members are arranged to traverse between cubes—may be suitably chosen in order to distribute forces in a manner that improves the load bearing capacity of such structure. Examples of loadbearing structures 2000 making use of cube and linking member embodiments may include: glasshouse constructions, constructions to cover large areas, high rise buildings constructions, Furniture, shelves (or the like).

Figure 12:
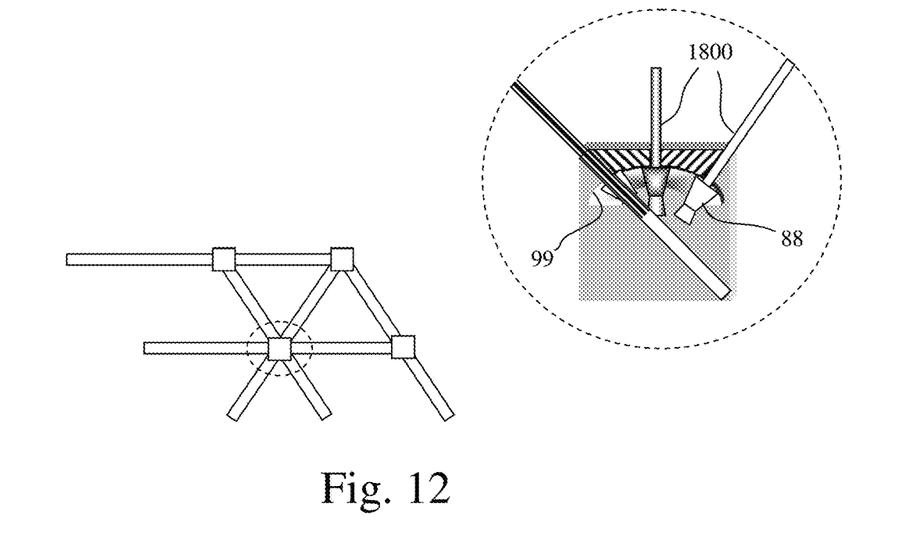
FIGS. 12 to 17 schematically show cube-like member embodiments suitable for forming a three dimensional structure as in FIGS. 10 and/or 11.

FIG. 12 demonstrates that such linking members 1900 may take form of cables that can be fastened by fasteners 88 located within the cubes. Enabling such fastening within a cube may be facilitated by forming cubes from more than one, here two, parts as shown in FIGS. 13, 16 and 17.

Figure 13:
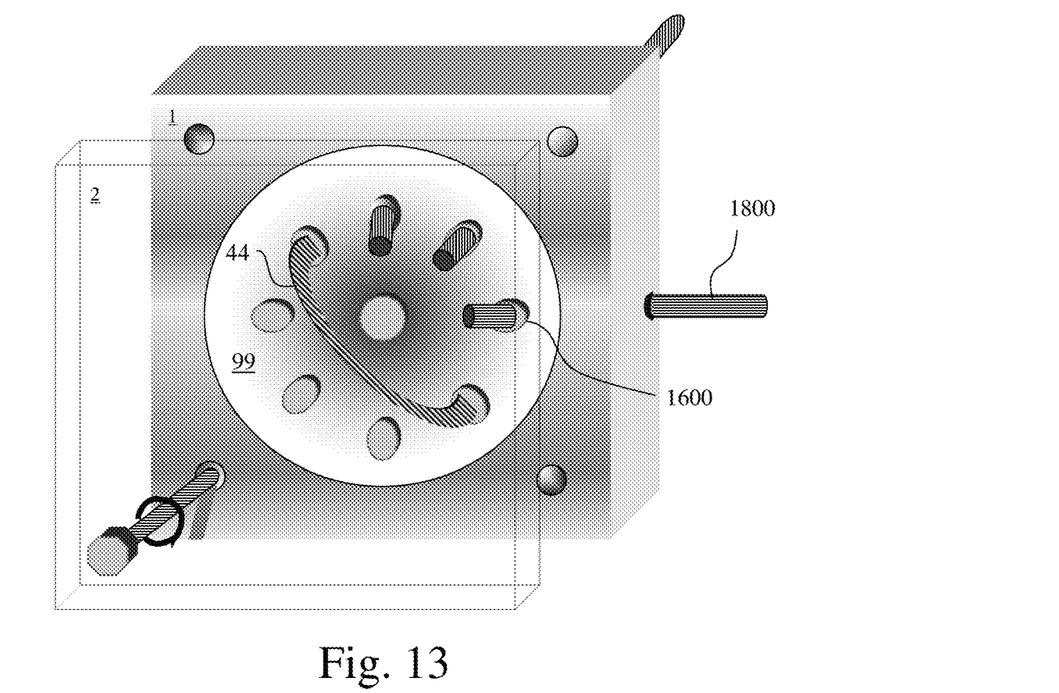

In the example of FIG. 13, cables 1800 are shown being threaded through bores 1600 of a cube with possibly some of the cables being made to bend back out of the cube after insertion at a U-turn or bend 44. The example of FIG. 13 accordingly shows a cube being made of two parts 1, 2. The cable 1800 being made to bend back here passes through relative adjacent bores formed in the same part 1 of the cube.

Figure 16:
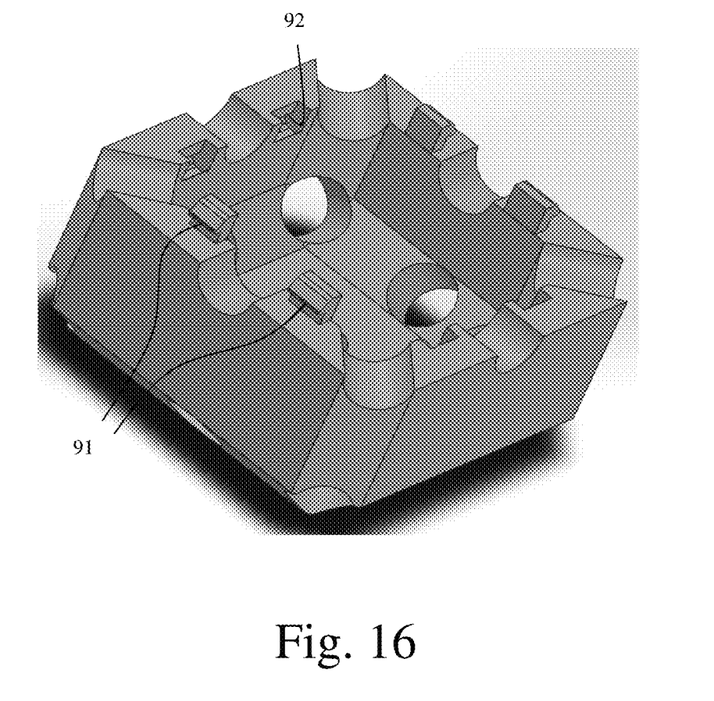
Figure 17:
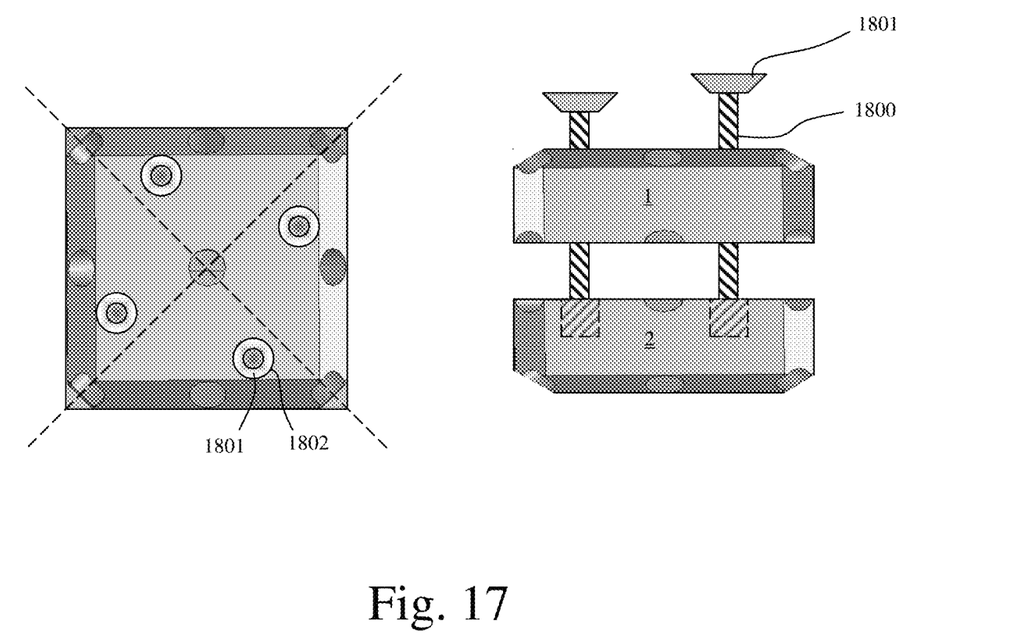

The example of FIG. 16 embodies a possibility of a cube where connection between parts of the cube may be facilitated by so-called snap fit arrangements. Such snap fit arrangements may be configured each to include corresponding engaging bulge members 91 and undercut members 92 designed to engage each other. Upon engagement, bulge members 91 of one part engage undercut members 92 of the other part. In this example, each part (here only one being seen) includes both bulge and undercut members 91, 92.

Figure 14:
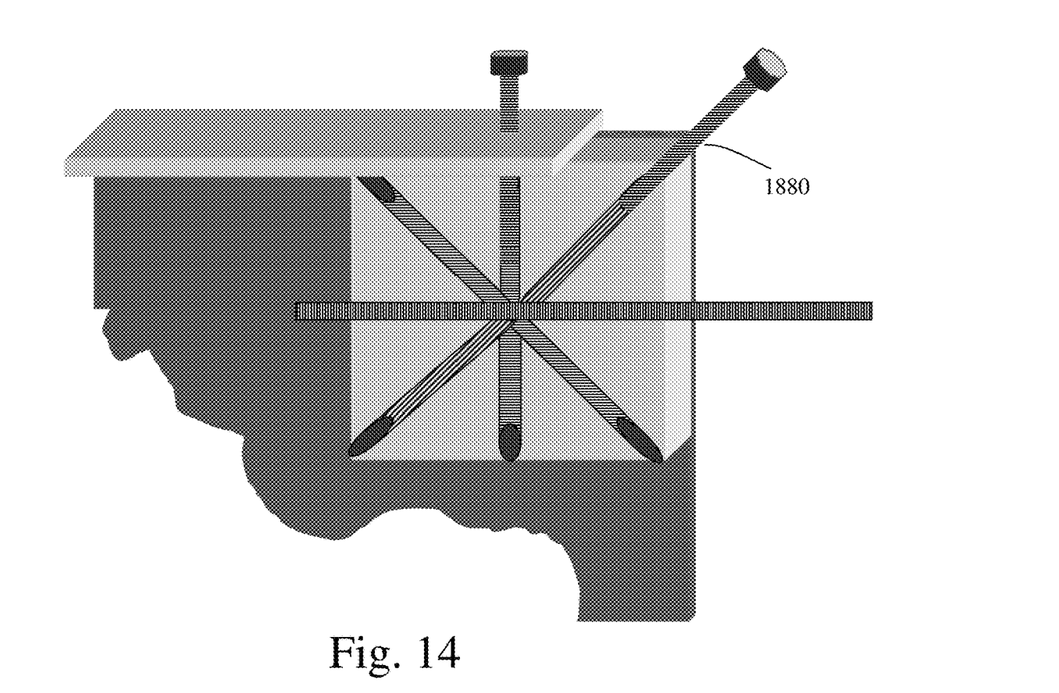

FIG. 14 exemplifies that bores through the cubes may be threaded to permit fastening members 1880 (e.g. screws) to be placed in threading engagement within the bores. FIG. 17 exemplifies two parts 1, 2 of a cube being connected by fastening members 1800 in this example in form of bolts. The cube in this example is arranged to include countersinks 1802 in its facets for receiving the heads 1801 of bolts that are used to connect the two parts of the cube. The countersinks permit the bolt heads to be flush with facets of the cube and by that provide a planar facets suitable engagement by other parts/members in a structure where such cubes may be used. FIG. 15 provides a view of an optional fastener 88 that may be formed of two or more parts for providing firm grip onto linking members (such as cables) threaded through bores in the cubes.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Further more, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

The invention claimed is:

1. A structure configured to provide accessibility to knowledge skills, the structure comprising:
a plurality of cubes,
wherein for each of the plurality of cubes:
the cube includes through-going bores in each facet of the cube, at least one of the through-going bores in at least one facet of the cube receive pegs or link members configured to enable connecting of the cube with at least one other cube of the plurality of cubes;
the through-going bores extend through the cube to meet at a center of the cube;
an internal spherical cavity is formed at the center of the cube where the through-going bores meet; and
the cube consists of two segments that are physically attached to form the cube; and
wherein at least one cube of the plurality of cubes includes markings thereon to assist in identification of at least a portion of the cube in images acquired of the cube.

2. The structure of claim 1, wherein markings comprise coloring of facets of the cube with different colors.

3. The structure of claim 2, wherein at least one of the cubes serves as an orientation cube for defining a coordinate system of the structure.

4. The structure of claim 3, wherein axes of the coordinate system are defined by at least some of the facets of the orientation cube as axes perpendicular to such facets.

5. The structure of claim 4, wherein at least some of the facets defining the axes comprise markings.

6. The structure of claim 1, wherein each cube is further configured to receive other pegs or link members arranged to connect alphanumeric characters to at least some of the through-going bores, where the other pegs or link members comprise an elastic member for assisting in manual coupling of the alphanumeric characters into through-going bores of the cube.

7. The structure of claim 1, wherein each cube comprises twenty-six through-going bores.

8. The structure of claim 7, wherein each facet of a cube is associated with nine through-going bores, wherein positions of the nine through-going bores comprise one through-going bore being at a center of the facet, one through-going bore at each corner of the facet, and one through-going bore at a center of each edge bounding the facet.

9. The structure of claim 8, wherein the through-going bores at a center of a facet extend perpendicular to the facet and the through-going bores at corners or edges of a facet extend transverse to the facet.

10. The structure of claim 1, wherein the internal spherical cavity serves a variety of utilities.

11. The structure of claim 10, wherein the variety of utilities comprises housing in the cavity of the internal spherical cavity internal members.

12. The structure of claim 11, wherein a face of the internal spherical cavity serves as a counter face upon which the internal members bear upon.

13. The structure of claim 12, wherein the internal members are fasteners.

14. The structure of claim 12, wherein the internal members are illumination modules.

* * * * *